US008952825B2

(12) United States Patent
Hoeft et al.

(10) Patent No.: US 8,952,825 B2
(45) Date of Patent: Feb. 10, 2015

(54) MONITORING DEVICE FOR AN UNGROUNDED POWER NETWORK OF A PHOTOVOLTAIC SYSTEM

(75) Inventors: Wolfgang Hoeft, Barntrup (DE); Andreas Senger, Altenbeken (DE); Christian Bacht, Bad Pyrmont (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 13/099,049

(22) Filed: May 2, 2011

(65) Prior Publication Data

US 2012/0256754 A1    Oct. 11, 2012

(30) Foreign Application Priority Data

Apr. 11, 2011  (DE) .......................... 10 2011 016 700
Apr. 14, 2011  (DE) .......................... 10 2011 017 051

(51) Int. Cl.
| | |
|---|---|
| *G08B 21/00* | (2006.01) |
| *H02H 3/00* | (2006.01) |
| *H02H 7/20* | (2006.01) |
| *H02S 50/10* | (2014.01) |
| *H02H 9/02* | (2006.01) |

(52) U.S. Cl.
CPC ................ *H02H 7/205* (2013.01); *H02H 9/02* (2013.01); *H02S 50/10* (2013.01)
USPC ........................................... 340/650; 361/42

(58) Field of Classification Search
CPC ........ G01R 27/18; G01R 31/025; H02H 3/16; H02H 3/36
USPC ........................................... 340/650; 361/42
See application file for complete search history.

(56) References Cited

U.S. PATENT DOCUMENTS

| | | | | |
|---|---|---|---|---|
| 6,084,757 A | * | 7/2000 | Fogh et al. ...................... | 361/58 |
| 6,147,483 A | * | 11/2000 | Havel ............................. | 324/115 |
| 6,731,116 B2 | * | 5/2004 | Yamamoto et al. ............ | 324/522 |
| 6,736,116 B2 | * | 5/2004 | Kawano ......................... | 123/520 |

(Continued)

FOREIGN PATENT DOCUMENTS

| | | |
|---|---|---|
| EP | 0884817 | 12/1998 |
| EP | 1437600 | 7/2004 |
| EP | 1 887 675 A2 | 2/2008 |

(Continued)

OTHER PUBLICATIONS

Austrian Office Action, Ref: 3B GM 369/2011—1, Applicant: Phoenix Contact GmbH & Co. KG, Dated: Mar. 6, 2014.

*Primary Examiner* — Brian Zimmerman
*Assistant Examiner* — Thomas McCormack
(74) *Attorney, Agent, or Firm* — Reising Ethington PC (57) ABSTRACT

A monitoring device for an ungrounded electric network of a photovoltaic system. The monitoring device includes a short circuit measuring circuit having a first electric measuring circuit conductor connecting a first electric pole of the photovoltaic system with a reference point by means of at least one protective component, and second electric measuring circuit conductor for connecting a second electric pole of the photovoltaic system with ground be means of at least one protective component. A first component is connected between one of the measuring circuit conductors and ground, and a measuring device for measuring an electric parameter of the first component, wherein a non-zero value of the parameter and/or a change of the value of the parameter indicate an electric fault between the photovoltaic system and ground.

11 Claims, 6 Drawing Sheets

(56) References Cited

U.S. PATENT DOCUMENTS

| | | | |
|---|---|---|---|
| 2004/0130326 A1* | 7/2004 | Yamamoto | 324/503 |
| 2009/0256576 A1* | 10/2009 | Weems et al. | 324/520 |
| 2012/0026631 A1* | 2/2012 | Kazemi et al. | 361/42 |

FOREIGN PATENT DOCUMENTS

| | | |
|---|---|---|
| JP | 02237421 | 9/1990 |
| JP | 2009-244275 | 10/2009 |
| WO | 2004093284 | 10/2004 |

\* cited by examiner

MONITORING DEVICE FOR AN UNGROUNDED POWER NETWORK OF A PHOTOVOLTAIC SYSTEM

FIELD OF THE INVENTION

The invention concerns a monitoring device for an ungrounded power network of a photovoltaic system.

BACKGROUND OF THE INVENTION

For practical reasons, electric networks of a photovoltaic system in small or medium size networks often have an ungrounded design. This has the advantage that, for example, in the case of a ground connection of one of the electric poles, merely the electrical potential of this particular pole is shifted to the ground potential. Consequently, the electric network is "single error safe" because a single ground fault has no, or only a minor effect on the operation.

A further advantage of an ungrounded network is the utilization of the full electrical potential difference between both electric poles, resulting in a maximum power output of the photovoltaic system.

In small or medium systems such a design is possible when the systems are provided with an external lightning protection, for example, the building surge protector. In large systems, such lightning protection is more difficult to realize. Therefore, these systems typically have a one end ground.

However, this results in a higher error rate because the network is no longer single error safe. Moreover, it can result in the fact that some of the power to be generated is abandoned. This is due to the fact that the ground potential can be constantly higher or can have a value other than zero.

Another reason for the grounding of the isolated electric network is the high supply voltage of large photovoltaic systems which can reach a range of several thousand volts, wherein currently a range of up to 1,000 volts is common.

In low-voltage power networks, customary earth-leakage monitors are installed between the network and a ground connection point. In such installations, it is of disadvantage that capacitive grounding cannot be measured. In addition, it is possible that an "incorrect validation" of a shifting of the residual voltage between the network connection and the ground potential can result in false alarm. This is caused by fluctuating ground potential and possibly weather-dependent coupling impedance between the network and the ground. Furthermore, "symmetric" isolation faults cannot be discerned. Symmetric isolation faults are faults occurring on both electric poles of the electric network. Finally, with regard to such common earth-leakage monitors, sensitive measurements are not made with passive earth-leakage monitors, but it is required to use active earth-leakage monitors. This is not possible, or only to a limited extent, when using customary AC converters for photovoltaic systems.

GENERAL DESCRIPTION OF THE INVENTION

The invention is based on the objective of providing a monitoring device for photovoltaic systems which eliminates or at least reduces the problems mentioned above, and which provides even for large photovoltaic systems the possibility to use an ungrounded electric network which offers a high safety standard.

The objective of the invention is achieved by means of the subject matter of the independent claims. Advantageous developments of the invention are defined in the dependent claims.

The invention provides a monitoring device which is able to detect a possible ground fault of at least one electric pole of the photovoltaic system.

The photovoltaic system has an isolated structured electric network with a first and a second electric pole. Usually, an isolated electric network does not have any pole of the photovoltaic system connected with a ground. A ground connection only comes about, when a fault exists, for example, when a short of one of the electric poles occurs through one of the electric lines inside the photovoltaic system with a ground.

Accordingly, a ground can be any electrically conductive connection point which is connected with a pole of the photovoltaic system, for example, a ground connection of a surge protector. In particular, this involves connection points of other electric networks, wherein a connection with a different electric network, for example, a household power supply system, can occur even indirectly, for example, via electrical appliances or leakage currents.

According to the invention, an electric measuring circuit is connected with the photovoltaic system in order to monitor a ground fault or an electric fault in general, wherein a first electric measuring circuit conductor is connected with the first electric pole of the photovoltaic system, and a second electric measuring circuit conductor is connected with the second electric pole of the photovoltaic system. Consequently, the measuring circuit conductors are connected with a first end to a respective electric pole of the photovoltaic system. Both electric measuring circuit conductors form a short circuit of the isolated network of the photovoltaic system, wherein preferably both measuring circuit conductors are designed to have high impedance in order to limit the current flowing from the photovoltaic system through the measuring circuit conductors. Accordingly, the short circuit measuring circuit formed in this way is an arrangement for measuring and monitoring purposes installed in addition to the electric network of the photovoltaic system. With their second ends located opposite of the poles of the photovoltaic system, both electric measuring circuit conductors are connected with a point of reference which has a mutual reference potential with an electric fault of the photovoltaic system. For example, this can be a ground.

Consequently, a point of reference, subsequently described as ground, is a mutual reference potential which electrically connects the fault of the photovoltaic system and the second ends of the measuring circuit conductors located opposite of the poles of the photovoltaic system. A ground connection is the electrical connection with this mutual reference potential.

A first electronic component is interconnected between one of the measuring circuit conductors and the ground. Furthermore, the monitoring device comprises a measuring device for measuring an electrical parameter of the first component. In particular, the measuring device comprises two input lines, so-called channels, in order to obtain, especially by taking a difference, the value of the electrical parameter at measuring points before and behind the first component.

In case the photovoltaic system does not contain any ground fault or fault, no current or only low current flows through the electronic component to the ground or away from the ground. Accordingly, a value of the electrical parameter non-zero and/or a change of the value of the parameter indicates a ground fault in the photovoltaic system. Therefore, the existence of a ground fault is detected in response to a value of the electrical parameter non-zero and/or a change of the value of the electric parameter of the first electronic component.

In a preferred embodiment of the monitoring device, the first component is interconnected into the measuring circuit, and there into the first measuring circuit conductor. In addition, the monitoring device comprises a second component which is interconnected into the measuring circuit into the second measuring circuit conductor. Also in this embodiment of the monitoring device, both electric measuring circuit conductors are connected with a ground. On the other end, each measuring circuit conductor is connected with a respective electric pole of the photovoltaic system.

In the event of a ground fault, such a monitoring device can detect the fault location in such a way that the location can be narrowed down to one of the two electric poles of the photovoltaic system. As a result, it is easier to detect the fault location of the ground fault.

In this preferred embodiment, the measuring device measures the electrical parameter of the first and the second component. It is preferred when the measuring device comprises three channels in order to obtain, especially by taking a difference, the value of the electrical parameter at measuring points before the first component, between the first and the second, as well as behind the second component. For the purpose of measuring the electrical parameters of both components, it is possible to use, if required, a separate circuit for measuring each electrical parameter and to supply the obtained signal to a comparator circuit. This arrangement is also viewed as one measuring device.

If required, the measuring device comprises a memory for saving characteristics of components to be measured, especially the impedance and/or the thermal behavior of the impedance of the component or the components.

Furthermore, the monitoring device comprises preferably a comparator circuit in order to compare the value of the electrical parameter of the first and the second component. In particular, the comparator circuit involves an analogous comparator. It is preferred when the comparator circuit involves a microcontroller connected to the output side of an analog-to-digital converter, so that the values of the electrical parameters are converted into digital signals and directly compared in the microcontroller. In particular, the microcontroller can calculate deviations between the values of the electrical parameters of the components. It is preferred when in the case of deviations the microcontroller can transmit an information signal to allow for further actions, for example, a fault indication or protective measures.

In particular, the electrical parameter is the voltage dropping at the first or second component, or the current flowing through the first or second component.

In particular, the electronic components are impedances, for example, ohmic resistances.

In particular, but not limited to, each high-impedance connection of the electric poles of the photovoltaic system is realized by means of a series of protective impedances connected in series. Advantageously, in this way, creepage and clearance paths are formed, making it possible to bridge large spatial distances. This is of advantage for separating the voltage of the ground potential when using voltage that exceeds 400 V.

If required, the monitoring system triggers appropriate signals and/or protective measures when a ground fault is detected, for example, an optical or acoustic signal, or disconnecting the electric network from other devices, such as AC converters, or shorting the electric network of the photovoltaic system. Accordingly, the signal and/or protective measures are suitable to avert a threat for humans and/or devices.

Subsequently, the invention is described in more detail by means of embodiments and in reference to the figures, wherein the same or similar elements are mostly provided with the same reference numerals and the characteristics of the different embodiments can be combined with one another.

BRIEF DESCRIPTION OF THE FIGURES

It is shown in.

DETAILED DESCRIPTION OF THE FIGURES

Figure 1:
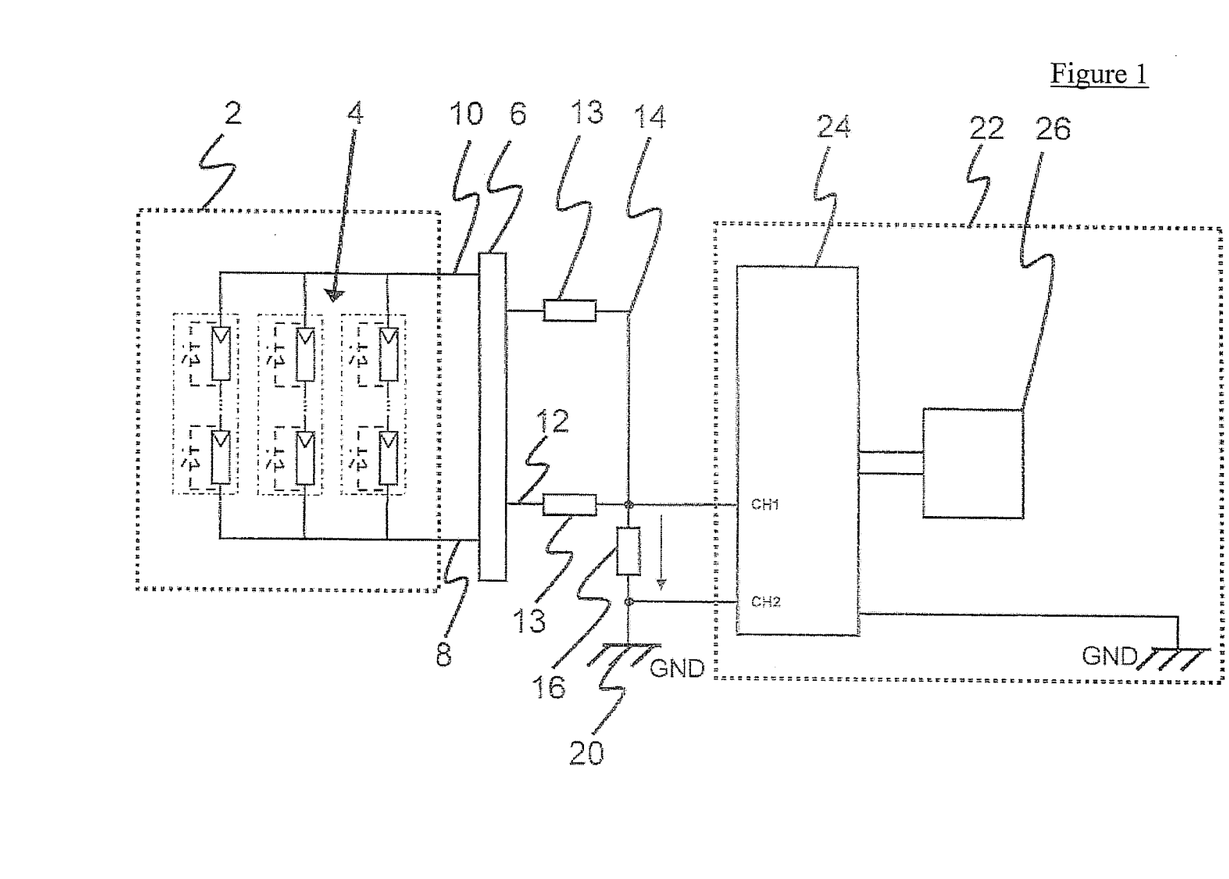
FIG. 1: a first embodiment of the invention having a monitoring device with an electric measuring conductor of a short circuit measuring circuit, FIG. 2 an embodiment of the invention having a monitoring device for two electric measuring circuit conductors, FIG. 3 an embodiment of the invention having a series of protective impedances, FIG. 4 the embodiment shown in FIG. 3 with a fault sketched in, FIG. 5 the embodiment shown in FIG. 3 with an alternative fault sketched in, FIG. 6 the embodiment shown in FIG. 2 with an alternative connection to the ground.

FIG. 1 shows a first embodiment of an invention-based ungrounded electric network 2 of a photovoltaic system 4. The network 2 is connected with a connection terminal 6 by means of a first and a second electric pole 8, 10. By means of a first and second electric measuring circuit conductor 12, 14, an electric measuring circuit is also connected with the connection terminal 6, and consequently it is connected with first or second pole of the photovoltaic system. In order to avoid that high currents run through the measuring circuit and that high losses are sustained via the measuring circuit, protective components 13, especially protective impedance, are respectively interconnected into the first and second measuring circuit conductor 12, 14 of the measuring circuit.

In the example at hand, the protective impedances are ohmic resistances. In the event that alternating electric fields should be measured, the protective components 13 are capacitors.

On its other end, the electric measuring circuit is connected with a ground 20. A first component 16 is connected between the measuring circuit conductors 12, 14 and the ground 20. In particular, the first component 16 is also an impedance, for example, an ohmic resistance, wherein the value of the resistance of the first component 16 does not need to correspond to the value of the resistance of the protective components 13.

In order to keep the voltage loss at the first component 16 low in comparison to the protective components 13, a considerably smaller value is selected for the resistance of the first component 16 than for the resistance of the protective components 13. In particular, the value of the resistance of the first component 16 is smaller than the value of the protective components 13 by a magnitude of 1,000. In the examples shown the protective components have an ohmic resistance in the range of $M\Omega$, the first component 16 has an ohmic resistance in the range of $k\Omega$.

When the ungrounded electric network 2 is faultless, especially without a false, undesired ground connection, a closed circuit is generated from the connection terminal 6 over the first electric measuring circuit conductor 12 and the second measuring circuit conductor 14, wherein the protective components 13 are selected in such a way that a small current value prevails there.

When measuring the electric parameter at the first component 16 by means of the measuring and/or evaluation device 22, the electric parameter provides information as to whether the network has an error condition. If, in the embodiment shown, no current, or only a very small current flows via the first component 16 from the network or to the network, there exists no ground fault. Here, the measured electric parameter is the electric voltage dropping at the resistor 16 from which the current can be estimated.

It is preferred when the voltage is measured at the first component 16 in that one tap, respectively, before and behind the first component 16 leads to the measuring and/or evaluation device 22. The tap before the first component 16 is called CH1, channel 1, the tap behind the first component 16 is called CH2, channel 2. The value of the measured electrical parameter (for the embodiment shown the electric voltage) is directly converted into a digital signal by means of an analog-to-digital converter 24 (ADC 24). The digital signal is further evaluated via a microcontroller 26.

In the event of a fault, i.e., an undesired ground connection of one of the poles 8, 10 of the isolated electric network 2 of the photovoltaic system 4, current flows into the measuring circuit between the first and second measuring circuit conductor 12, 14 and through the first component 16, or current flows out of the measuring circuit and also through the first component 16. In both cases, i.e., when a fault occurs at the first electric pole 8, as well as when a fault occurs at the second electric pole 10, the fault is detected by means of the first component 16. The fault is determined when a predetermined threshold of the value of the electric parameter at the first component 16 is exceeded, in this example, the voltage dropping at the first component 16.

Figure 2:
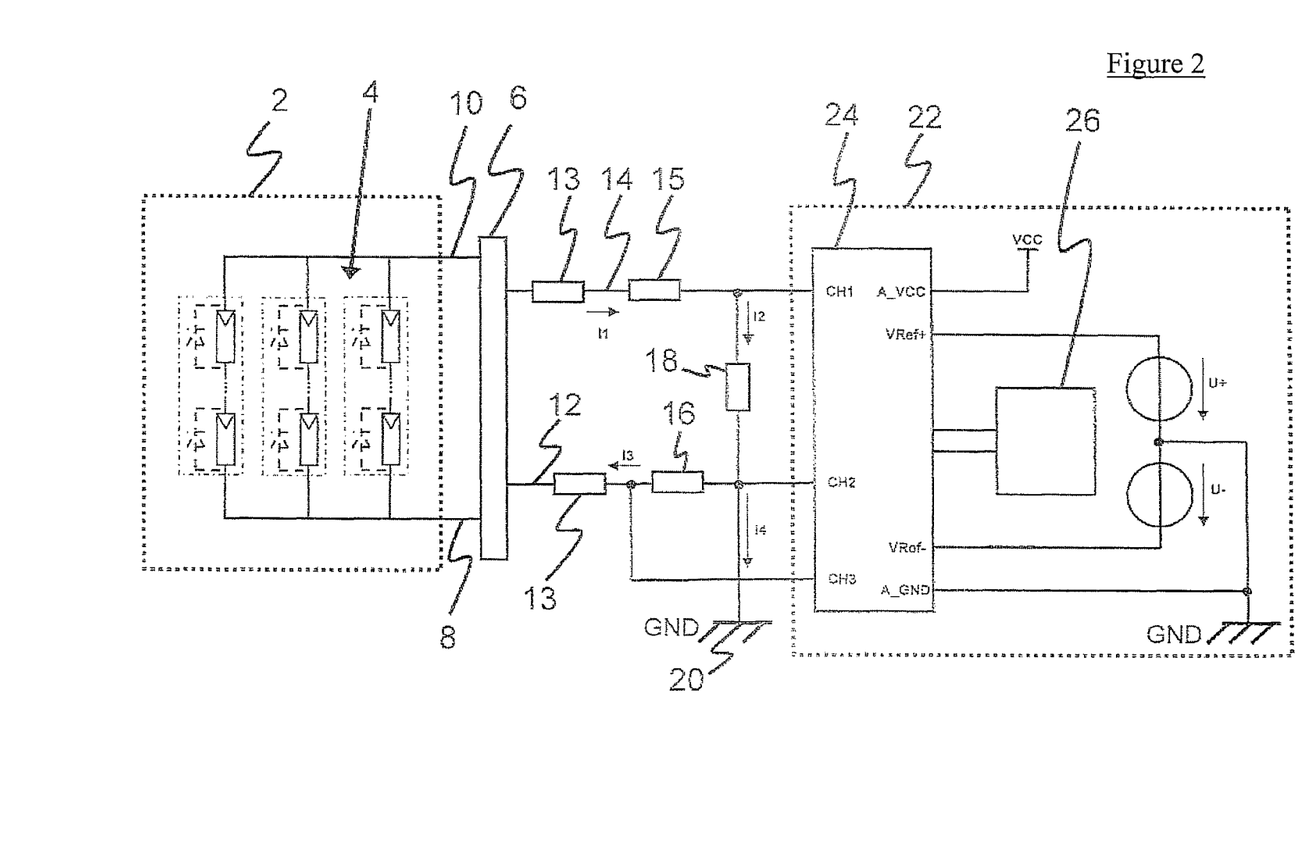

FIG. 2 shows a further embodiment of the invention, which comprises a second component 18 in addition to the first component 16. Here, the measuring and/or evaluation device 22 measures and evaluates the electric parameters of the first component 16 and the second component 18. Also the value of the ohmic resistance of the second component 18, the same as the value of the first component 16, is selected smaller than the values of the protective components 13 in order to reduce the voltage loss at the ADC 24.

To compensate the influence of the first component 16 on the first electric measuring circuit conductor 12, for example, a change in total resistance, an equalizing component, equalizer 15, has been integrated in the second measuring circuit conductor 14. Ideally, the first component 16, the second component 18 and the equalizer 15 have the same ohmic resistance. If the resistances of the first and second component 16, 18 differ to the extent that the desired precision is not achieved, the measuring and/or evaluation device 22 includes a compensating calculation or an analogous compensation of the resistances. For this purpose, the microcontroller 26 comprises a memory in which the resistance values of the components used are saved. For example, in a calculation, it is possible by means of the microcontroller 26 to provide a multiplier for the value of one of the digital signals obtained, which also allows the measuring and/or evaluation electronic to be adapted to the components 16, 18 used, for example, when the components are exchanged.

In order to measure the electric parameter, here the electric voltage at both components 16, 18, a tap is taken at three points: before the second component 18, in FIG. 2 described as CH1 (channel 1), between both components 16, 18, in FIG. 2 described as CH2, as well as behind the first component 16, in FIG. 2 described as CH3.

The above-mentioned type of interconnection with the tap at three points (CH1, CH2, CH3) allows for using only three measuring points when measuring the electric parameter at two components 16, 18. For example, it is possible to measure the potential difference between CH1 and CH2, as well as between CH2 and CH3. The potentials measured are converted in digital signals by means of an analog-to-digital converter. By means of simple digital subtracting, it is possible to determine the value of the potential difference at the second component 18 according to U2=CH1−CH2, the value of the potential difference at the first component 16 according to U1=CH2−CH3.

The connection of the ADC 24 to ground by means of a voltage divider shown in FIG. 2 (U+ and U−) allows for measuring positive, as well as negative voltages, wherein it is only possible to use half of the potential ADC voltage range, respectively. Depending on the application, this connection possibility is used or the one shown in FIG. 6.

Figure 3:
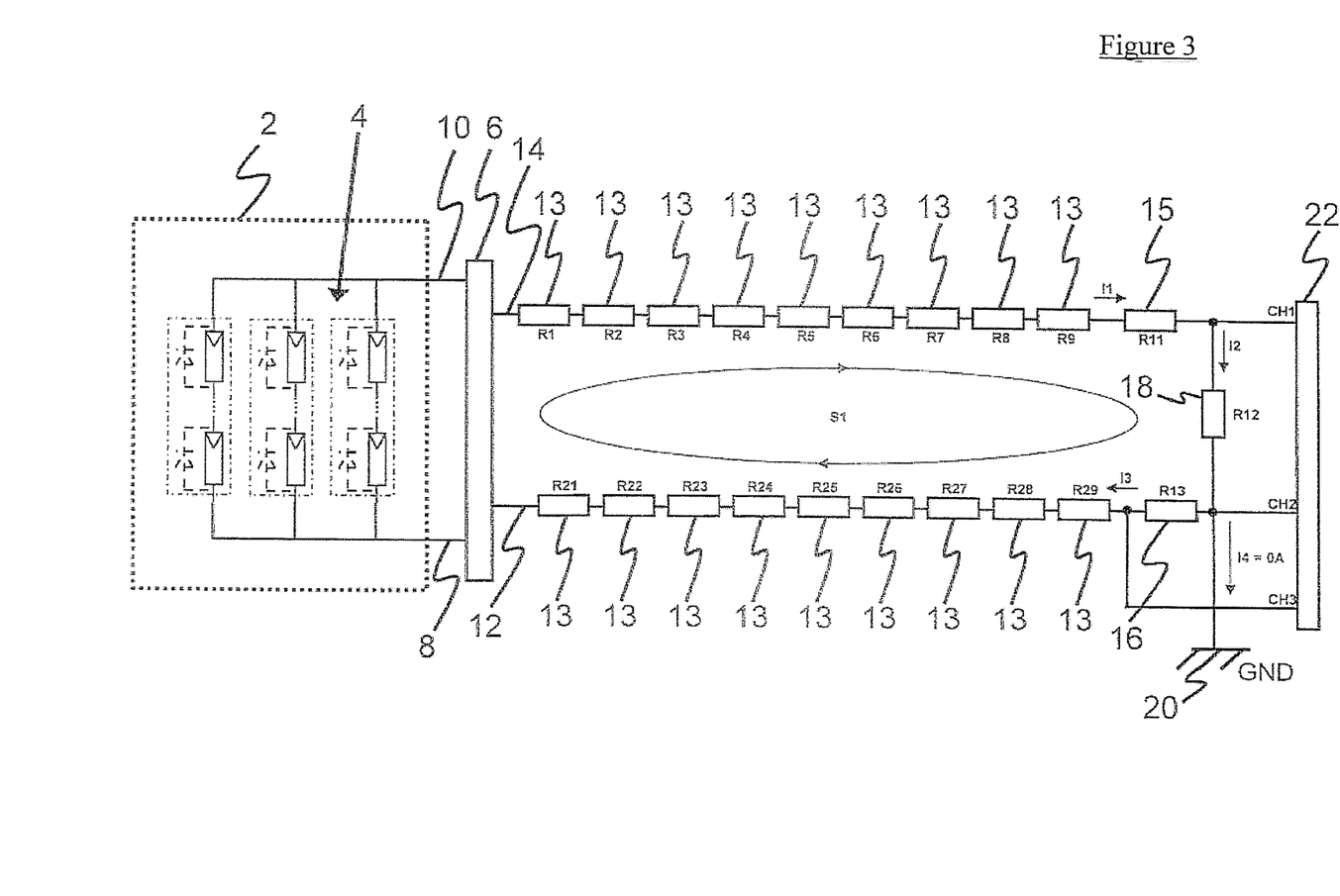

FIG. 3 shows a further embodiment of the invention, in which a series of protective components 13, respectively, is installed in both measuring circuit conductors 12, 14. By means of the series of protective components 13, protection and creepage paths are formed for high voltages because at each protective component 13 only part of the total voltage of the ungrounded electric network 2 of the photovoltaic system 4 drops. In this way and by forming a gap when placing the protective components 13 next to each other, a secure electric separation of the electric network 2 from the ambience of the ground 20 can be guaranteed even in the event of high supply voltages, particularly 1,000 V and above.

It is obvious that the embodiment shown in FIG. 1 can also comprise such a series of protective components 13.

Furthermore, FIG. 3 shows by means of S1 the current flow for a faultless case. The arrows I1 to I4 symbolize the anticipated currents. For the faultless case shown in FIG. 3, it applies in this embodiment that I1=I2=I3; I4=0. Consequently, no current flows to the ground or from the ground to the network. By means of CH1, CH2 and CH3, the measuring and/or evaluation device is able to determine the homogenous current flow at I1, I2 and I3. This represents the normal condition which can be monitored by means of the monitoring device shown.

Figure 4:
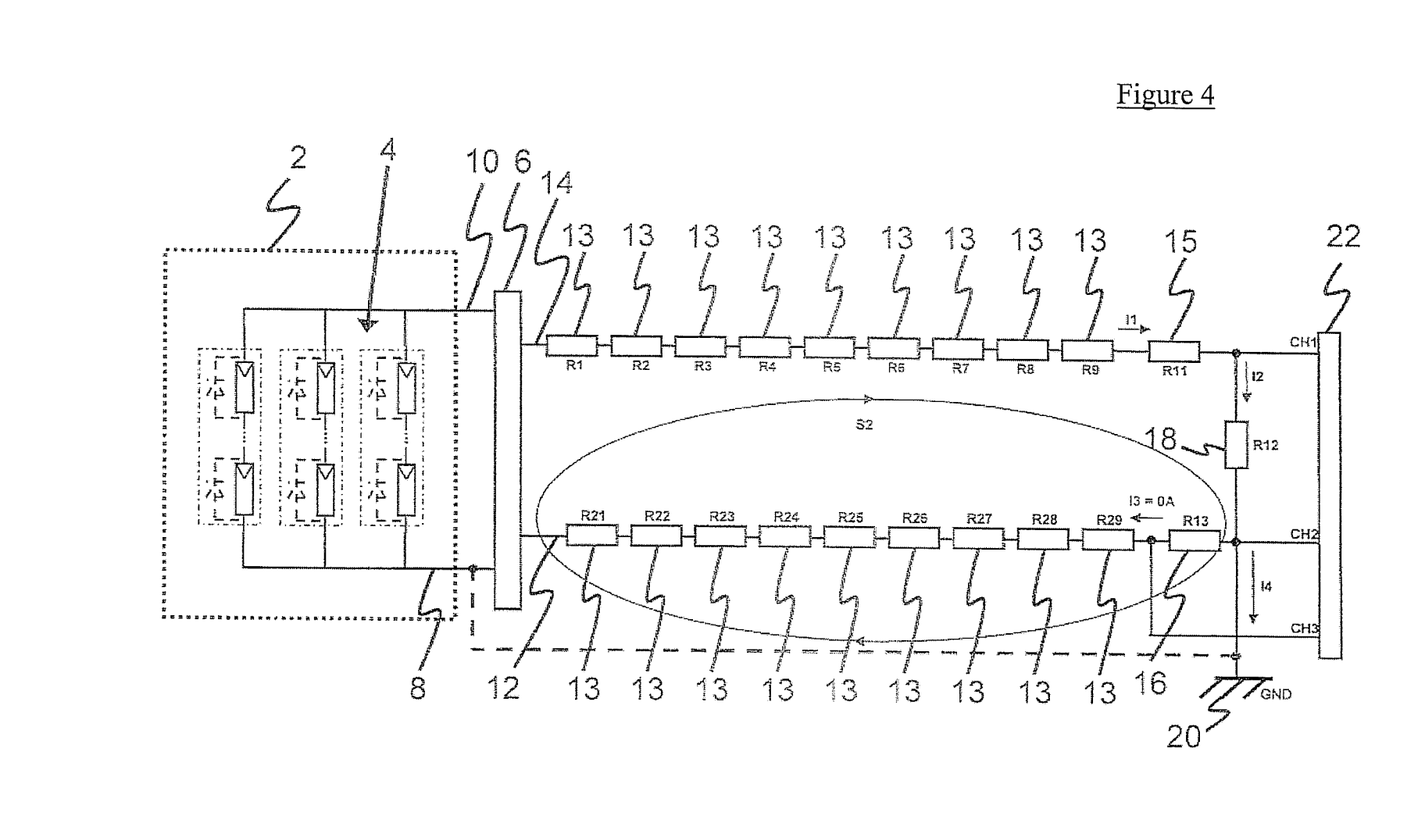

FIG. 4 shows the embodiment shown in FIG. 3 with a fault that is indicated by a dotted line. The fault (ground fault) at the first electric pole 8 of the photovoltaic system 4 represents an asymmetric fault; it results in a change of current flow in the monitoring device, as is indicated with the current flow S2 and the arrows I1 to I4. In the fault shown, the current flow flows from the second electric pole 10 to the ground 20 and via a mutual reference potential connection to pole 8. Accordingly, in the event of a fault, the current flow differs between the first component 16 and the second component 18, which can be determined by means of the measuring and evaluation device 22. In a total, resistance-free fault between the first electric pole 8 and the mutual reference potential point 20, the current flow disappears through the first electric measuring circuit conductor 12, i.e., it is reduced to I3=0 A, as emphasized in FIG. 4. The fault shown here can be detected by comparing the current flow through the first component 16 with the current flow through the second component 18. When there is an approximately equal current flow it can be assumed that the network is faultless. A fault is indicated when there is a clear difference between both current flows, defined by thresholds, through the first component 16 and the second component 18.

In a simple case, the microcontroller divides the result of the measurement for the first potential difference U1 (CH3−CH2) by the result of the measurement for the second potential difference U2 (CH2−CH1). A deviation from the result U1/U2=1 beyond defined thresholds indicates that there is a fault.

If required, it is possible to introduce further display and/or protective measures after detecting a fault, as, for example, activating a warning light or an alert, or separating and/or shorting the total electric network 2 of the photovoltaic system 4 in order to protect persons and/or equipment.

Figure 5:
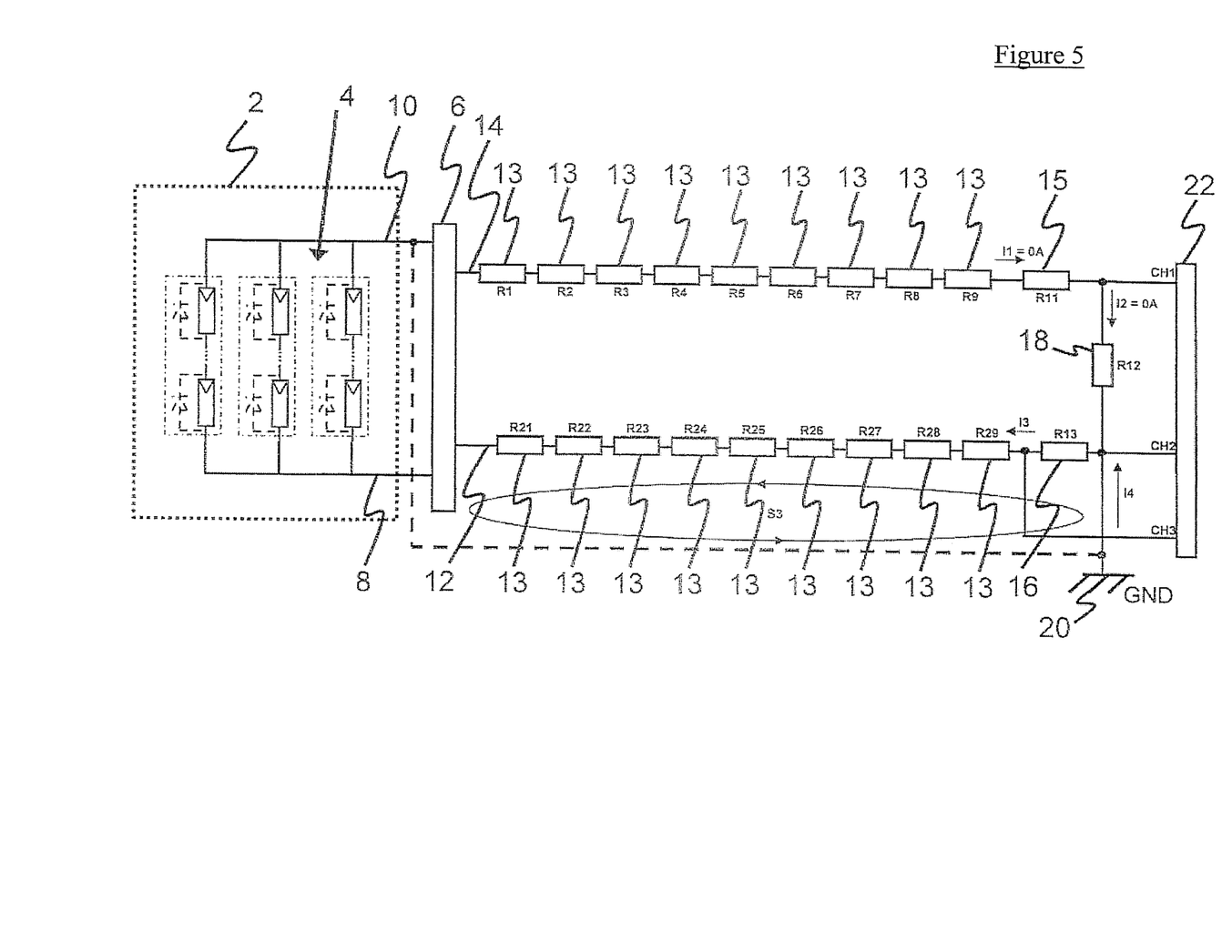

FIG. 5 shows also the embodiment shown in FIG. 3 with a different fault. The fault is a ground fault at the second electric pole 10 of the photovoltaic system 4 and also represents an asymmetric fault which can be detected by means of a change in current flow in the monitoring device. As shown in FIG. 5 by means of the current flow S3, as well as the arrows I1 to I4, the current flows from the second electric pole 10 via a mutual reference potential connection (in this example, an undesired ground connection) to the reference point 20 (in this example, the ground 20) and through the first electric measuring circuit conductor 12 back to the photovoltaic system 4. As in the embodiment shown in FIG. 4, the electric parameter of the first component 16 has a different value than the one of the second component 18. In the case shown in FIG. 5, the parameter is the voltage dropping at the resistor 16 from which the current flowing through the resistor 16 is estimated.

Figure 6:
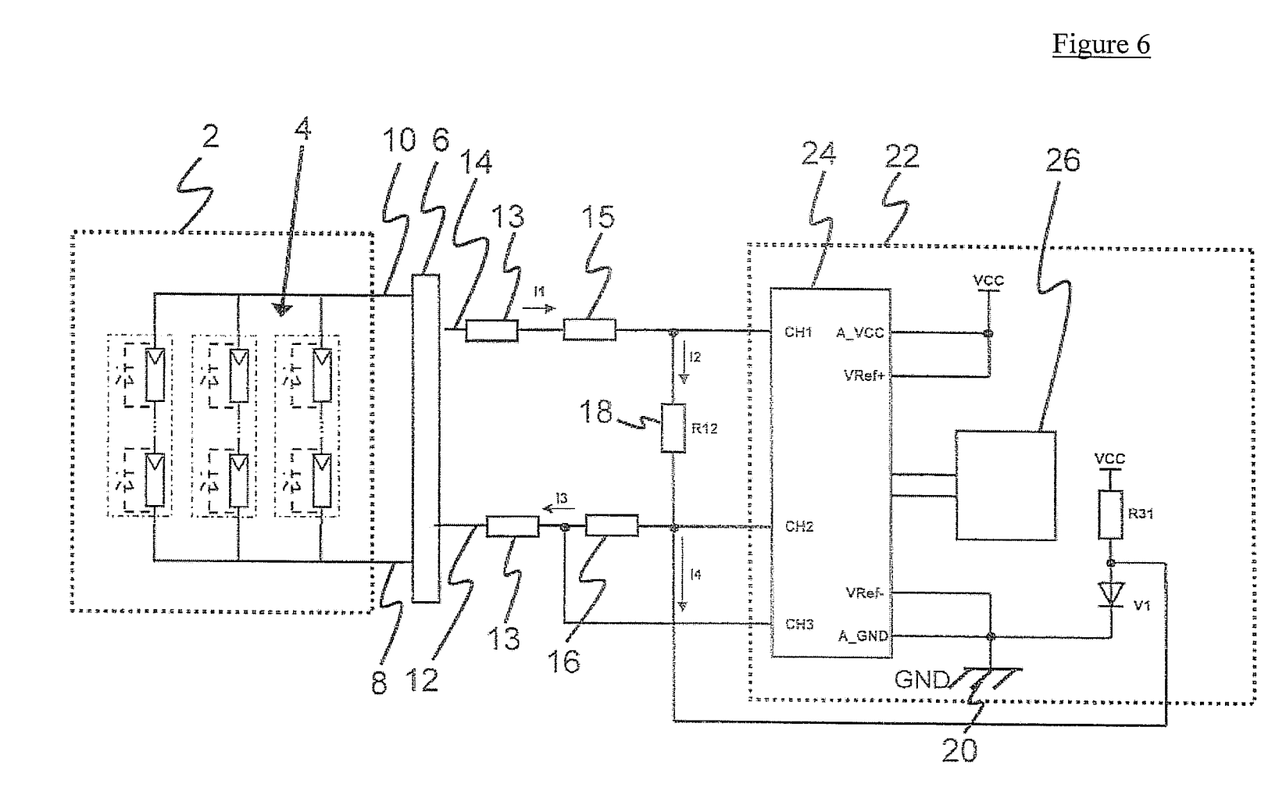

FIG. 6 shows a further embodiment of the invention. FIG. 6 differs from FIG. 2 in that it has an alternative structure of the measuring and/or evaluation device 22, as well as a mutually conducted ground 20. The diode V1 disconnects the short circuit measuring circuit from the ground 20, the supply voltage vcc supplies a definite voltage via the resistor R31 in order to compensate the threshold voltage of the diode V1. In the embodiment shown, the analog-to-digital converter 24 is directly connected with the ground 20. The embodiment shown desensitizes the measuring method shown, especially the short circuit measuring circuit, against ground potential fluctuations because the measuring method shown in FIGS. 2 to 6 subsists with a direct potential comparison of both measuring circuit conductors, and it is not required to measure the current flow relative to the reference point 20. Consequently, in this exemplary embodiment it is only possible to measure positive voltage at the ADC 24, while the total voltage range of the ADC 24 is available. Furthermore, by means of V1 an offset for the measurement at the first component 16 is provided, allowing for a measurement there by means of the circuit shown.

By further processing by means of the microcontroller 26, the measurement of the second component 18 allows in all embodiments shown even for drawing a conclusion to the overall voltage of the complete PV system.

It is apparent to an expert that the previously described embodiments only serve as examples. The invention is not restricted to these examples but can be varied in all kinds of ways without abandoning the invention. It is also apparent that the characteristics define even on an individual basis important elements of the invention, even if they are described in combination with other characteristics, regardless of whether they are disclosed in the description, the claims, the figures or otherwise.

REFERENCE LIST

2 ungrounded electric network of the photovoltaic system
4 photovoltaic system
6 connection terminal
8 first electric pole of the photovoltaic system
10 second electric pole of the photovoltaic system
12 first electric measuring circuit conductor of the short circuit measuring circuit
13 protective component
14 second electric measuring circuit conductor of the short circuit measuring circuit
15 equalizer
16 first component
18 second component
20 reference point
22 measuring and/or evaluation device
24 analog-to-digital converter
26 microcontroller

The invention claimed is:

1. Monitoring device for an ungrounded electric network of a photovoltaic system having:

a short circuit measuring circuit which comprises a first electric measuring circuit conductor extending from a first electric pole of the photovoltaic system to a connection node for connecting the first electric pole of the photovoltaic system with a grounded reference point, the first electric measuring circuit conductor including at least one protective component, and a second electric measuring circuit conductor extending from a second electric pole of the photovoltaic system to said connection node for connecting the second electric pole of the photovoltaic system with said reference point, the second electric measuring circuit conductor including at least one other protective component, wherein both measuring circuit conductors are directly connected to each other by said connection node to form a mutual short at said reference point between the first and the second electric poles of the photovoltaic system, said first electric measuring circuit conductor further including a first component for measuring an electric parameter in the first electric measuring circuit conductor being integrated in the first short circuit measuring conductor of the short circuit measuring circuit, said second electric measuring circuit conductor further including a second component for measuring an electric parameter in the second electric measuring circuit conductor being integrated in the second short measuring circuit conductor of the short circuit measuring circuit, and a measuring device for measuring an electric parameter of the first component, wherein an electric fault between the photovoltaic system and the reference point can be detected in response to a value of the parameter non-zero and/or a change of the value of the parameter wherein the measuring device is designed for measuring the electric parameter of the first and the second component, wherein the electric parameter is the electric voltage dropping at the first or second component or the current flowing through the first or second component, and wherein the measuring device measures at three measuring points, including before the second component, between the first and second components, and behind the first component.

2. Photovoltaic system comprising at least one photovoltaic module for generating electric current, wherein the electric network of the photovoltaic system is designed as an ungrounded electric network and a monitoring device according to claim 1.

3. Method for safely operating a photovoltaic system with an ungrounded electric network and with a monitoring device according to claim 1, comprising the following steps:

measure the electric parameter of the first component by means of the measuring and evaluation device evaluation of the electric parameter of the first component by means of the measuring and evaluation device in order to determine whether there exists a fault in the ungrounded electric network of the photovoltaic system.

4. Method according to claim 3, comprising also the following steps:
To digitalize the electric parameter by means of the analog-to-digital converter,
To process the digital signals by means of the microcontroller for the purpose of comparing and/or calculating deviations.

5. Method according to claim 3, comprising also the following steps:
To display a fault by means of the indicator and/or to protect the photovoltaic system by means of the protective device by shorting or disconnecting the network in response to a value of the electric parameter that indicates a fault.

6. Monitoring device according to claim 1, wherein the measuring device comprises a comparator circuit for comparing the value of the electric parameter of the first and the second component, wherein the comparator circuit registers an electric fault between the ungrounded electric network and the reference point when electric parameters show different values.

7. Monitoring device according to claim 1, wherein the first and the second component each are an impedance.

8. Monitoring device according to claim 1, wherein the connection with the reference point is realized by means of a series of protective impedances connected in series in order to bridge creepage and/or clearance paths.

9. Monitoring device according to claim 1, wherein the comparator circuit comprises and analog-to-digital converter for converting the electric parameter into a digital signal, as well as a microcontroller used for comparing the digital signals and/or for calculating deviations.

10. Monitoring device according to claim 1, wherein the measuring and evaluation device comprises and indicator for displaying a fault and/or a protective device for shorting or disconnecting the ungrounded electric network to avert a potential threat for humans and devices.

11. Method for safely operating a photovoltaic system with an ungrounded electric network and with a monitoring device according to claim 1, comprising the following steps:
measuring the electric parameter of the first component by means of the measuring and evaluation device, measure the electric parameter of the second component by means of the measuring and evaluation device in order to draw conclusions with regard to the current flow through the second measuring conductor,
evaluation of the electric parameter of the first component and of the electric parameter of the second component by means of the measuring and evaluation device and
compare the electric parameters of the first and second component obtained by means of the measuring and evaluation device in order to determine whether there exists a fault in the ungrounded electric network of the photovoltaic system.

* * * * *